United States Patent Office 3,582,336
Patented June 1, 1971

3,582,336
METHOD OF PREPARING OIL-MILK-SUGAR CLAD CEREAL PARTICLES AND THE RESULTING PRODUCT
Ben E. Rasmusson, 12510 SE. 62nd Place,
Bellevue, Wash. 98004
No Drawing. Continuation-in-part of application Ser. No. 555,810, June 7, 1966. This application July 18, 1967, Ser. No. 654,058
Int. Cl. A23l 1/10
U.S. Cl. 99—83       8 Claims

ABSTRACT OF THE DISCLOSURE

Prepared cereal particles clad with an oil-milk-sugar mix, wherein a proteinaceous constituent in the form of toasted, fried, and/or expanded cereal particles is enveloped or coated with a cladding constituent having a melting point in the range of from about 96° F. to about 110° F., which cladding constituent is at least principally comprised of substantial amounts of hard butter vegetable oil, milk solids, and sugar or a sugar substitute, and being applied to the cereal particles only superficially, the cereal particles thereby being in substantially non-crushed condition. Food products of the invention can comprise a relatively small amount of cladding constituent so as to leave the final product in flake or loose form in a manner characteristic of boxed breakfast cereals, or sufficient cladding constituent can be applied to render the product in fixed form, i.e. bar-like. Optionally, such food products can incorporate one or more additional ingredients such as an emulsifier, salt, flavoring, an antioxidant, vitamin and mineral additives, and the like. In general, the oil-milk-sugar cladding constituent imparts to the prepared cereal particles a sweet, cream-like taste when eaten, which is comparable to that of a breakfast-type prepared cereal to which both sugar and fluid milk have been added. This taste simulation results either when the food product is eaten in dry form, or with water added.

CROSS-REFERENCE TO RELATED APPLICATION

This application is a continuation-in-part of my co-pending United States patent application Ser. No. 555,810, filed June 7, 1966, and entitled "Automated Forming of Molded, Non-Refrigerated Food Products, Feeder Mechanism Therefor, and Products Formed Thereby."

BACKGROUND OF THE INVENTION

Field of the invention

This invention relates generally to cereal based, ready-to eat food compositions, and methods of making such compositions. Prepared cereal particles such as dry breakfast cereals and the like, having a charactersitic toasted, fried and/or expanded (i.e. "puffed") form and characteristic taste depending on the cereal grain source and the manner of preparation of the particles, are clad with an uncooked adherent coating which is in solid form at normal room temperature and which has a melting point at about body temperature. Such cladding adherent is essentially comprised of so-called "hard butter" vegetable oil, milk solids, and a sugar or sugar substitute, and optionally includes salt or other flavoring or texturizing constituent, emulsifying agents, anti-oxidants, vitamin and mineral additives, and the like.

Description of the prior art

So far as is known, there are no prior non-refrigerated, ready to eat, oil and milk bearing, prepared cereal type food products wherein the cereal particles are sweetened and cream-like and retain the characteristic uncrushed form and taste imparted by the manner of preparation of the cereal particles (i.e. the crisp, fragile nature thereof), and which allow one the convenience of eating the product without necessity of having to add fluid milk, cream or the like thereof to simulate a fresh "cereal in milk" product taste.

Matz U.S. Pat. No. 2,824,806 discloses a compressed food product involving cereal type ingredients with binder additives, the compositions being compressed into bar form to provide a food product of the type commonly used for military field rations. In such a product, the cereal particles become severely compressed and crushed, and become substantially impregnated with the bindner additives. As is well-known, the taste and desirability of this type of product leaves much to be desired, primarily because of its crushed nature and the thorough impregnation of the cereal by the binder constituents.

SUMMARY OF THE INVENTION

In general terms, the present invention is directed to a food composition comprising a cereal constituent made up of toasted, fried and/or expanded prepared cereal particles, such as so-called "breakfast food" cereals, having a characteristic form and taste imparted by the manner of preparation of the prepared cereal from cereal grain. In accordance with the invention, such cereal particles are clad with an uncooked oil-milk-sugar cladding constituent. Such cladding constituent is applied to the cereal particles in generally fluid condition, having been preheated above its characteristic melting point (about 96° F. to about 110° F.). Such cladding constituent at least principally comprises hard butter vegetable oil as the fluidifying ingredient, with a relatively high content of dry milk solids, preferably non-fat dry milk solids, and adequate sugar or sugar substitute to provide the desired sweetened, cream-like taste in the final product. In addition, various optional ingredients can be employed, such as an emulsifier, salt or other flavoring, an antioxidant, vitamin and mineral additives, and the like, as desired. Optional additional solid constituents can be dried fruits, freeze-dried fruits, nuts, nut meants, bacon bits, dried meat particles, and the like.

It is among the features of the invention to provide a pleasant tasting cladding constituent for prepared cereals and the like, which is comprised of an oil-milk-sugar mixture and which is stable on storage. Cladding of dry prepared cereal type aggregates with this constituent produces pre-prepared and ready-to-eat food products of the breakfast cereal type, either in flake or loose form as commonly characteristic of boxed breakfast cereals, or in preformed bar form. Products of the invention, thus constituted, can be eaten without any fluid milk added or without other further preparation, either in dry form or with simply water added, and without addition of sugar or sweetener, or without use of utensils such as bowls and spoons, if desired. Also, properly packaged products of the invention are storable indefinitely in non-refrigerated storage.

As used herein, the term "proteinaceous, toasted, fried and/or expanded or 'puffed' cereal particles, or the like," means any of the wide variety of dry, cereal grain based food products available commercially, such as corn flakes, puffed corn, toasted oat cereal, toasted rice cereal, puffed rice, toasted rice, whole bran cereal, whole bran cereal with wheat germ, bran flakes, wheat flakes, puffed wheat, shredded wheat, wheat germ, French fried noodles, French fried corn meals, and mixtures or combinations thereof, for example. Known protein fortifiers such as soy flour can also be employed in the course of preparation of the cereal constituent, if desired.

The "hard butter" vegetable fats or glyceridic oils used in the binder base are types which are free of lauric acid. Suitable lauric acid-free vegetable oils or fats include corn oil, cottonseed oil, olive oil, palm oil, peanut oil, rice bran oil, soybean oil, sunflower oil, and mixtures thereof. These oils are treated, as by hydrogenation, interesterification, or fractional crystallization, so as to stabilize the oils and modify their melting points consistent with the desired melting point temperature range of approximately 96° F. to 110° F. In practice of the invention, the "hard butter" vegetable oil melting point is selected generally in accordance with the climatic conditions in the geographical region in which the product is to be stored and used, with relatively higher melting points being used in products intended for storage and use in hotter climates.

The cladding agent, which otherwise might be termed an encasing or enveloping agent, forms only a superficial sheath or encapsulation of the cereal particles, without substantial impregnation thereof, so as to not destroy the inherent form and taste of the cereal particles. Such cladding constituent has a relatively high content of dry milk solids to provide, in conjunction with the oil content of the cladding constituent, a taste simulation which is cream-like in character. With the sugar ingredient thereof, the composite cladding constituent provides simulation of both a cream-like taste characteristic and a sweetened taste characteristic which are very palatable.

Functionally, the cladding constituent, being at least principally comprised of the oil with the dry milk solids and sugar or sugar substitute additives, functions as what might be termed a "taste carrier," whether the final food product is in loose form or in bar form. Further, the cladding constituent, being applied to essentially all exposed surfaces of the cereal particles, functions as a moisture sealant to safeguard the cereal particles against increase in moisture (i.e. against loss of crispness) and against oxidation. In the case where the final product is in fixed, bar-like form, sufficient cladding constituent is present to function as an interparticle binder, filling the particle interspaces substantially completely and thus providing the characteristic fixed form of the product. In the case where the final product is in loose or flake form, the cladding constituent also serves as an adhesion agent for optional, subsequently applied dry ingredients, such as in the case where the oil-milk-sugar cereal particles, after solidification of the cladding constituent, are "dusted" or superficially dry coated with instant soluble milk powder, powdered sugar and the like, the subsequently applied powder in this instance being principally adhesively retained by the cladding constituent and being nonetheless available (in the instance where the dry coating comprises milk powder) to dissolve instantly in added water so as to simulate the appearance of fluid milk.

Since it is desirable to avoid graininess in the cladding constituent, all dry powder incorporated therein should be refined to the smallest practicable particle size. The milk solids as incorporated in the cladding constituent are preferably spray-dried skim powder, i.e. non-fat dry milk solids. Optionally, the dry milk solids can have included therewith a proportion of spray dry powdered whey from cheese manufacture, if desired. Casein or so-called non-dairy imitation milk solids also can be employed as or included in the "dry milk solids," within the context of the present invention.

The sugar used in the binder preferably should be finely powdered sucrose, such as 6X or 10X grades of highly refined manufacturer's type sugar. If desired, dextrose type sugar can be substituted for at least a portion of the sucrose.

In the context of the present invention, the sugar constituent can also include or consist of corn syrup, molasses, brown sugar, invert sugar, honey, or malt syrup, simply by way of further example. Artificial sweeteners can also be employed, if desired.

For the flavoring ingredient, vanillin and ethyl vanillin are preferred if the end product is to have a milky or cereal-like character. However, other oil soluble imitation flavors can be added to provide the end product with any desired milk, fruit, nut, or candy-like flavor.

Salt is preferably added to enhance the flavor and to reduce the oily taste. The salt should be refined to a 44 micron size or siftable through a 325-mesh sieve.

An emulsifier, generally lecithin, may be added in a small quantity as shown by the following tables. In addition to lecithin, there are several other products which may be used, including polyoxyethylene esters of higher fatty acids, triglycerides of fatty acids, mono and diglycerides and the palmitates of sorbitan.

In a manner conventional per se, the food compositions of the present invention can also comprise an anti-oxidant such as BHA (butylated hydroxyanisole) or BHT (butylated hydroxytoluene).

Also in a manner conventional per se, various vitamins and minerals in prescribed amount can be added to food compositions of the present invention, such as thiamin (F1), riboflavin, niacinamide, pyridoxine (B6), Vitamin B12, ascorbic acid (C), iron, lysine, vitamins A–D in vegetable oil, iron phosphate, sodium acetate, glycine, calcium carbonate, tricalcium phosphate, sodium ascorbate, and the like, for example.

A typical formulation for the cladding agent is shown below.

TABLE I.—CLADDING CONSTITUENT
(Using hard butter only)

| | Broad range, percent by weight | Preferred, percent by weight |
|---|---|---|
| Sugar, refined (or powdered) | 48–60 | 52–55 |
| Hard butter vegetable oils | 25–35 | 28–31 |
| Non-fat dry milk solids | 10–20 | 13–17 |
| Flavor (artificial) | 0.1–0.2 | 0.1–0.2 |
| Salt | 0.1–0.2 | 0.1–0.2 |
| Emulsifiers | 0.25–0.75 | 0.5–0.7 |
| BHA anti-oxidant | 0.000–0.006 | 0.002–0.004 |

TABLE II.—CLADDING CONSTITUENT
(Using hard butter with glyceride limpid oil)[1]

| | Broad range, percent by wt. | Preferred, percent by wt. |
|---|---|---|
| Sugar, refined (or powdered) | 48–50 | 52–55 |
| Hard butter vegetable oil | 23–35 | 28–31 |
| Limpid oil [1] | 0–3 | ½–2 |
| Non-fat dry milk solids | 10–20 | 12–16 |
| Flavor (artificial) | 0.1–0.2 | 0.1–0.2 |
| Salt | 0.1–0.2 | 0.1–0.2 |
| Emulsifier | 0.25–0.75 | 0.5–0.7 |
| Anti-oxidant | 0.000–0.006 | 0.002–0.004 |

[1] Added after tempering completed or just prior to use of finished mix, the limpid oil tends to serve as solvent like-carrier for the hard butters creating a smoother more cream-like (non-waxy) taste characteristic.

Typical formulation ranges of the final mixture of binder and food aggregate is as follows:

TABLE III.—CLAD AGGREGATE (BAR TYPE PRODUCT)
(Using expanded crisp rice)

| | Broad range, percent by wt. | Preferred, percent by wt. |
|---|---|---|
| Cladding | 60–80 | 70–72 |
| Aggregate | 20–40 | 28–30 |

TABLE IV.—CLAD AGGREGATE (LOOSE TYPE PRODUCT)
(Using expanded crisp rice)

| | Broad range | Preferred range |
|---|---|---|
| Cladding, percent by wt. | 10–40 | 15–30 |
| Aggregate, percent by wt. | 60–90 | 70–85 |
| Dry milk particles subsequently dusted onto clad aggregate | [1] 0–15 | [1] 8–10 |

[1] Parts by weight, based on 100 parts clad aggregate.

One procedure for making the cladding constituent is now described, wherein vegetable oil hard butters which are free from lauric acid are used. The hard butters are first melted to a temperature of 130° F. to 140° F. in a thermostatically heat controlled mixing tank. As an optional practice, "seed" fat, approximating about 2% to 4% of the total fat content, may be withheld in which event it is not melted initially but is added later. The temperature is then reduced to approximately 115° F., and the emulsifier, 50% of the lecithin, and all dry ingredients are added to the melted fat and mechanically blended at about 115° F., using care not to overheat and "cook" the milk constituents. Such blending is continued for a period of time sufficient to ensure complete dispersion and wetting of all ingredients. Since the powdered dry milk solids, sugar and salt are not wholly soluble in the fats of the mixture, it is desirable to finely pulverize these ingredients sufficiently to prevent graininess. This may be done by processing the blended mass through a conventional 5-roll refiner. After refining the mix is reheated, if required, to about 115° F. and pumped to a mixing tank where, under controlled temperature, it is mechanically mixed by moderate agitation for 10 to 12 hours. If the optional "seeding" procedure is practiced, the "seed" portion of the fat and lecithin are then added. The finished mixture is then pumped to a holding tank or to shipping containers. If the cladding agent is to be used directly, it is tempered at about 110–115° F. for at least about 30–40 minutes prior to use, whereupon the aggregate is added and under thermostatic control the temperature is reduced to near the solidification or "setting" point of the mixture, determined by the preselected melting point of the hard butter. In practice, the temperature must be held at that point which will keep the mass plastic, but will not be warm enough to cause the binder to run freely off or be adsorbed into the enrobed aggregate particles.

An alternative procedure, for making the milk base cladding agent without a refining process, eliminates the need for the 5-roll refiner and instead requires the use of prerefined powdered or pulverized dry particles with a particle size comparable to 325 mesh screen, i.e. approximately 44 microns, or smaller.

In this method, the hard butters are melted at 130–140° F., then cooled at 115° F. Other ingredients are then introduced and all ingredients are thoroughly blended at about 115° F. for 45 to 60 minutes or sufficient to insure complete dispersion and thorough wetting of all ingredients. If stored prior to use, the cladding mixture is preferably tempered for 30 to 40 minutes at about 115° F. and then held at that temperature until used.

To achieve mixing without damage to the relatively fragile aggregates, a heated trough and mixing screw conveyor is used. The blades of the conveyor must be suitable to ensure both thorough mixing and delivery of the cladding agent and aggregate to the production line without damage. The heated trough, usually water-jacketed, is maintained at about 100° F. to 115° F. throughout the mixing and delivery process with its temperature carefully regulated to ensure full plasticity of the cladding constituent near the melting point of the hard butters being used.

It has been found more advantageous to mix the dry, solid aggregate into the warm, fluid cladding agent, rather than vice versa. The fluid cladding agent serves as a lubricant to ensure movement of the dry aggregate throughout the mixing procedure without damage to or crushing of the particles. The fluid cladding agent and solid particles are fed into the mixing conveyor at a measured and/or regulated flow rate, such control being effected by any of various suitable techniques, including visual observation with manual or automatic control of pump speeds, etc. or by mechanically controlled measuring and/or weighing devices which accurately match flows of ingredients with production speeds. One or more vibration type dispensing hoppers can be installed above and along the infeed end of the screw mixer. With the dry ingredients thus being added to the wet, fluid binder, the ingredients are gently tumbled over and over as they progress through the screw mixer.

After the thoroughly blended mixture of solid particles and cladding agent leaves the mixer conveyor, the mixture is then elevated to the hopper of a filling, proportioning, or dispensing device, such as disclosed in my co-pending application 555,810. It has been found, if elevation is required, that screw-type elevating conveyors can severely damage the fragile cereal aggregate. Bucket-type conveyors can be used but are not preferred. In practice, the best elevating method has been found to be an edged rubber or neoprene belt having raised laterally extending sections or flights which serve both to carry the mixture upwardly and forcibly transfer the material off the belt as the sections or flights course the uppermost pulley of the conveyor. In this instance, depending upon ambient room temperature, it may be necessary to keep the moving belt warm. Heat is readily applied by mounting infrared heat lamps on the conveyor chassis.

As mentioned above, it is important to keep the cladding agent just plastic enough to ensure fully covered cereal particles. Otherwise stated, if the binder is overheated, it will be absorbed into and/or run off the particles and adhere to them unevenly. Conversely, too little heat causes insufficient particle coverage and premature setting of the cladding.

As indicated, proportioning and dispensing of the mixed composition may be accomplished with the filler equipment disclosed in my above-mentioned U.S. patent application Ser. No. 555,810. Other filling or dispensing equipment might be used if it is heat-maintained and capable of handling the mass without damage to the fragile aggregates.

EXAMPLE I

To provide a supply of pre-mixed cladding mix for use in this and subsequent examples, approximately 10 kilograms of binder base was prepared in a steam jacketed candy kettle maintained at 115° F. To formulate the binder base, the following constituents in the following amounts were mixed in the kettle:

|  | Grams |
|---|---|
| Dry refined sugar (6X) | 5,400 |
| Hard butter vegetable oil (M.P. 96° F.) | 2,900 |
| Spray dried non-fat dry milk | 1,700 |
| Lecithin (emulsifier) | 50 |
| Salt (50–50 flour salt) | 10 |
| Flavoring (vanillin) | 10 |
| BHA (anti-oxidant) | 0.5 |
| Total | 10,070.5 |

As a first example of practice of the invention, 151 grams of expanded crisp rice (Rice Krispies) was gradually mixed into 362 grams of heated (115° F.) cladding agent to provide a mixture of cereal and cladding agent which was proportionately about 30%–70% by weight. The total mixture volume was about one quart.

The mixed ingredients were gently and thoroughly intermixed with a large tablespoon for several minutes until each crisp rice particle was thoroughly and evenly coated with the agent. During such mixing the temperature was maintained at 115° F. Upon removal of the mix from the heat source, and upon gradual cooling, when the temperature of the mixture was reduced to about 100° F., i.e. slightly above the selected setting-melting point of the particular hard butter vegetable oil ingredient of the cladding agent, the mixture began to congeal slightly so that the cladding was still plastic but exhibited no further run-off on the cereal particles. At this point the conglomerate mass was characterized by an even distribution of the cladding agent throughout the cereal particle interspaces, and by complete though only superficial coating of the particles. With the temperature maintained at approximately 100° F., the mixture was maintained under gentle agitation while the mass was transferred and spread evenly onto a flat pan at normal temperature (70° F.). Upon cooling below 96° F., the mass fully congealed into solid form and was then cut into bar-like segments, then separated and individually packaged. Upon storage, the formed product exhibited no substantial separation of clad coating from the cereal particles, or other deterioration. When eaten, the formed product had the taste characteristic of a bowl of freshly creamed and sugared crisp rice.

EXAMPLE II

The procedure and proportions of Example I were duplicated with corn flakes, shreds of shredded wheat, expanded crisp oats, puffed wheat, and puffed rice squares. In each case it was necessary to vary the amount of cladding agent only slightly depending on the type and size of aggregate. In each case, also the resultant product was a solid breakfast cereal food tasting much the same as a prepared bowl of freshly creamed and sugared cereal. The clad cereals formed in Example II, as well as the clad crisp rice of Example I, were free of off-flavor taste and preserved examples have remained moisture stable during several months' storage.

EXAMPLE III

The processing of Examples I and II was repeated, except that after the cladding agent had been fully tempered for approximately 45 to 60 minutes of moderate agitation at approximately 115° F., then fluid limpid oil, in this case lauric acid-free cottonseed oil, was added to the cladding in an amount of approximately 1% relative to the total cladding agent, by weight. The limpid oil was added to the binder just prior to incorporation of the aggregate. The product was cooled under moderate agitation and solidified as in prior example. The resultant products tasted somewhat more creamy and seemed to disperse or melt more readily in the mouth when eaten.

EXAMPLE IV

A test production run was conducted with a six-wide Vitaline type refrigerated confection forming machine, modified to incorporate the mechanism disclosed in my aforesaid copending application Ser. No. 555,810. Such mechanism includes (1) hard butter melting and mixing facilities, (2) a temperature controlled heated mixing-screw conveyor, (3) dry aggregate hopper means for the cereal constituent, (4) vibrating feeders, and (5) a temperature controlled heated measuring-filling machine.

To produce approximately 48,000 volumetric 3 ounce product units, it was calculated that the cereal constituent would involve use of 1440 pounds crisp rice (about 400 volumetric gallons), and about 3200 pounds binder constituent (about 350 volumetric gallons).

The hard butter was melted and the cladding constituent was prepared using the ingredient proportions disclosed in Example I, except that in this instance the hard butter vegetable oil used had a melting point of 102° F. The cladding constituent was maintained at approximately 115° F., and was subjected to continued mechanical agitation until smooth and free from lumps or streaks, which tempering agitation proceeded for about 45 minutes. Meanwhile, the crisp rice aggregate was elevated to and stored in the hopper above the mixer-blending screw conveyor. The heated cladding agent was pumped into the revolving screw of the mixing-blending conveyor, and the vibrating feeder device under the aggregate hopper was activated. With the conveyor carefully temperature controlled to about 105° F., the cereal particles were thoroughly intermixed with the binder as these constituents proceed along the screw conveyor. All units were adjusted to produce a flow of the heated conglomerate mixture discharged from the conveyor to provide the discharge rate required to produce about 540 dozen product units per hour, an average production rate for a six-wide Vitaline confection forming machine. Once in operation, the mixing-blending screw conveyor temperature was monitored to cause delivery of the heated conglomerate mass therefrom at a temperature of about 105° F. Discharge of the conveyor was to a filling machine as disclosed in the aforesaid application Ser. No. 555,810, which was also heated and maintained at a regulated temperature of about 105° F. As the conglomerate mass was delivered to the heated hopper of the filling machine, its flow was adjusted to provide sufficient mass supply to maintain uniform filling of the Vitaline molds.

Certain modifications of a Vitaline machine are required when utilizing such for forming a non-refrigerated product according to the present invention. A Vitaline machine, as normally used to produce frozen confections, involves product refrigeration in a brine tank maintained from about —32° F. to —45° F. Such sharp refrigeration is not necessary for practice of the present invention. Accordingly, the brine tank of the Vitaline machine employed in this example was maintained at a temperature of about —5° F., with the compressors of the refrigeration system controlled to maintain this temperature. Also, the stick inserter mechanism of the Vitaline machine was moved upstream, i.e. near the filler end of the machine, approximately 4 feet from the filler machine, so the sticks were inserted into the mass-filled mold cavities within 3 feet of the molds first entering into the cold brine. The purpose of this relocation was so that the sticks would be placed into the heated, congealing mass prior to actual hardening or setting thereof to ensure that the cladding was still fluid enough to encompass the embedded sticks prior to complete hardening of the mass in each mold and thus ensure firm adherence of the mass to the inserted stick. Also, the usual hot water defrost temperature of the Vitaline machine was reduced from the normal 140° F.–180° F. temperature to about 110° F.–120° F., and the mold washing sections of the machine were set at a relatively higher than normal temperature, i.e. to about 150° F.–160° F., to ensure complete washing of the exhausted molds in the event of stick failure or failure of the extraction mechanism.

Similarly, the final mold rinse section of the Vitaline machine was adjusted to be relatively very hot (about 185° F.–195° F.) in comparison with its normal operating temperature, to ensure that the molds were both as dry and as relatively warm as possible upon return thereof to the filling machine.

It is notable that all of the above-recited changes in operation of the Vitaline machine, incident to practice of the present invention, are relatively minor and relatively easy to effect incident to actual production changeover.

The products formed in this run were wrapped and packaged in the same manner as is conventional with ice cream bars, with the exception that the products of course did not require refrigeration after manufacture.

The formed products produced in this test run were firm to the point of no noticeable crumbling under normal handling. On extended non-refrigerated storage the products showed no deterioration in apperance or taste characteristics.

EXAMPLE V

A production run similar to Example IV was carried out with crisp rice and raisins, each of which was discharged separately into the mixing conveyor containing the binder. The raisins replaced about 5% of the crisp rice, by weight, and were fresh whole oiled, free-flowing raisins. In the formed product, both the crisp rice and raisins were enrobed with binder, the binder in this instance serving to seal in the freshness of both the cereal and dried fruit constituents.

EXAMPLE VI

Another test run was made as in Example V, except that freeze-dried pineapple was substituted for the raisins, in the amount of approximately 3% of the crisp rice. In this example, the cladding agent was flavored lightly with oil soluble pineapple flavoring in the amount of ¾ oz. flavoring to 100 lbs. cladding mix, to fortify and enhance the characteristic fruit flavoring.

EXAMPLE VII

A further test production run was made with the binder and aggregate ingredients according to Example IV. In this instance the constituents were extruded from the filling machine onto a flat, moving conveyor with the individual portions thus being automatically formed into individual bar shape. In this instance the conveyor was arranged to immediately pass the product through a refrigerated air blast tunnel maintained at approximately −5 −15° F. This test run demonstrated that the products can be made without molding equipment, much in the manner conventional candy bars are formed.

It will be apparent to those conversant with the art of making frozen confections with equipments such as the Vitaline machine, the Polarmatic machine, the Nelson machine, and other cold air blast confection forming machines, that the products of the present invention can be made on or with such equipments, simply by appropriate modification of temperature in the various equipment sections.

As will also be evident, products, according to the present invention, whether formed by an automatic molding operation or otherwise, can be subjected to a post-forming coating or dry enrobing operation such as disclosed in my aforesaid copending application 555,810.

Practice of the present invention to form a flaky or loose type product, rather than a bar type product, involved use of considerably less cladding constituent, suitably in the range of from about 10% to about 40% binder by weight, relative to the weight of the cereal constituent, and preferably about 15%–30% by weight. In forming this type of product, the dry cereal can be tumbled at elevated temperature, e.g. 115° F. in a spray or atomized mist of the binder constituent. As will be apparent, this can be done either on a batch or a continuous basis. In view of the reduced amount of cladding constituent present, it has been found advantageous in preparing the loose form of product according to the invention to first subject the cereal particles to application of a cladding, suitably formulated as in Example I, then subsequently "dust" the clad particles with dried milk solids and/or sugar in dry particle form. This "dusting" serves to not only reduce the oiliness of the product and inhibit the enrobed particles from sticking together, but also add to the tastiness of the product in regard to its sweetness and milky characteristics. Further, when the enrobed and "dusted" particles have water added thereto, the presence of superficial milk solids on the surface of the binder coating results in a degree of prompt liquefaction of the milk product and provides a milky appearance to the added water.

EXAMPLE VIII

In order to specifically demonstrate the forming of a loose type product according to the present invention, the following test was conducted.

A cladding constituent was formulated as in Example IV, including hard butter vegetable oil having a melting point of 102° F., and corn flakes was selected as the prepared cereal aggregate. A five quart saucepan was preheated in an oven to about 120° F. The cladding constituent was melted in a double boiler at approximately 115°–120° F. and tempered at this temperature with sustained mixing for about 30 minutes. Then, 115 grams of corn flakes (at 72° F.) were placed in the heated saucepan and gently tumbled with a large spatula while 30 grams of the heated cladding constituent was sprayed upon the tumbling flakes from a heated atomizer. During this procedure, it was found advantageous to have the cereal aggregate slightly cooler than the cladding constituent to minimize absorption or impregnation of the cladding agent into the corn flakes.

After application of the cladding constituent to the loose flakes, the tumbling of the flakes was continued at a temperature of about 105° F. to further aid in spreading the coating uniformly over the surfaces of the flakes, which additional tumbling was continued for about 3 minutes. At the conclusion of the cladding operation, it was estimated that about 25 grams of the cladding constituent had been picked up by the cereal aggregate. The thus clad cereal particles were essentially completely covered with a thin, superficial coating of the cladding constituent. Then, a pre-prepared dry particle mixture was formulated from 80 grams powdered skimmed milk and 20 grams powdered sugar, and the milk-sugar particle mix was lightly sifted onto the clad flakes while the tumbling action was continued for approximately 3 minutes, during which time the temperature of the tumbling flakes was gradually reduced to about 95° F. Upon conclusion of this dusting operation, it was estimated that about 12 grams of the milk-sugar particle mix had firmly adhered to the solidifying clad coating on the flakes.

After cladding and dusting, the treated flakes were then cooled to ambient room temperature (72° F.) and packaged in airtight containers in like manner as conventionally employed with boxed, dried cereals. Upon storage, the product maintained its essentially loose character, without substantial interparticle bonding, and the crispness and taste characteristics thereof were quite stable. Upon mixing a serving of the clad particles with a substantial amount of water, sufficient to wet most of the particles but insufficient to flood the particles, the added water immediately took on a substantial whitened or milky appearance, by reason of the superficial availability of the solid milk particles and the ready solubility thereof in the water.

EXAMPLE IX

The constituent preparation and mixing procedure set forth in Example VIII was repeated, except in this instance there was added to the cladding constituent about 3% by weight (based on the weight of the cladding constituent) of a limpid oil, specifically a lauric-acid free, winterized cottonseed oil. The cottonseed oil was added to reduce the melting point of the cladding constituent slightly and promote thinner coverage of the cereal aggregate with the cladding mix. Also, the cottonseed oil addition demonstrably improved the "creaminess" of the final product, by releasing the vegetable oils more quickly to the taste buds when eaten.

EXAMPLE X

To simulate an intermediate volume test run for the production of a loose flake type product, some 16 pounds (about 20 gallons) of corn flakes were tumbled in an axially rotated, open ended, slightly inclined tumbler drum maintained at about 105° F. This tumbler drum was constructed with interior, generally circumferentially extending, inwardly directed vanes to produce a more pronounced cascading effect in the particle aggregate moving through the drum. To provide a spray or mist application of the cladding constituent onto the cascading cereal particles, a longitudinally arranged set of nozzles was constructed within the drum and supported above the drum's inner lower surface by non-rotating supports in spaced locations at the ends of the drum. A cladding constituent mix, heated to about 115° F. was fed through the nozzle array and thus sprayed onto the cascading cereal particles in the drum. It was estimated that the average transit time or exposure time of the flakes in the tumbling drum was about 3 minutes, and this extent of exposure proved adequate to provide on the flakes an essentially uniform cladding or covering of the cereal particles. The same cladding constituent mix was employed as utilized in Example VIII, i.e. a mix having a melting point of about 102° F.

In addition to the cladding spray, the clad aggregates were also subjected to being dusted with the milk-sugar particle mix utilized in Example IX, which dusting operaton was performed by lightly sifting the dry particles onto the cascading flakes in the discharge end of the tumbler drum. Cladding constituent pick-up and dry particle pick-up on the formed product during this run was comparable to that obtained in Example IX. Upon discharge of the clad and dusted particles from the tumbling drum, such was allowed to cool to room temperature and the formed product was packaged as in Example IX.

EXAMPLE XI

A further test was conducted as in Example X, with the constituents in this instance being 21 lbs. crisp rice (about 20 gallons), 5 pounds cladding constituent, and 7½ lbs. dusting particle mix, the latter being formulated from 6 lbs. powdered skimmed milk and 1.5 lbs. powdered sugar. In this instance somewhat less pick-up of the dry milk solids was observed, apparently because of the lesser relative surface area of the rice particles as compared with the surface area of the flaked corn. However, the sweetness and creaminess level of the finished product when eaten appeared substantially comparable to the product formed in the earlier example.

It will be apparent that various degrees of sweetness and "creaminess" can be achieved with any type of cereal aggregate by altering the constituent amounts, processing temperatures and exposure times.

From the foregoing, various further modifications and adaptations of the invention will occur to those skilled in the art to which the invention is addressed, within the scope of the following claims.

What is claimed is:

1. The method of superficially cladding toasted, fried or expanded prepared dry cereal particles with a cladding constituent having a melting point in the range of about 96° F. to about 110° F. and comprised of substantial amounts of hard butter vegetable oil, milk solids, and a sweetener to provide a ready-to-eat food product having the characteristic taste and form of the prepared cereal particles and also sweetness and cream-like taste characteristics comparable to that of the prepared cereal particles with sweetener and fluid milk added, said cladding constituent being comprised of a sweetener in an amount to provide the desired degree of sweetness in the final product, about 23–35 parts hard butter vegetable oil, and about 10–20 parts milk solids, relatively by weight and the proportion by weight of the cereal particles being coated, relative to the proportion by weight of the cladding constituent, being about 20–90 parts cereal particles to about 10–80 parts cladding constituent, said method comprising:
   (a) heating the cladding constituent to a temperature slightly above its melting point;
   (b) non-crushingly agitating the cereal particles;
   (c) lightly applying the heated cladding constituent to superficially and substantially uniformly clad the uncrushed cereal particles while maintaining agitation of the particles;
   (d) cooling the clad, uncrushed cereal particles to the point of solidification of the cladding constituent; and
   (e) packaging the clad cereal particles in a form wherein the cereal particles remain uncrushed.

2. The method of claim 1, wherein the amount of cladding constituent applied to the cereal particles substantially fills the interparticle spaces and binds the clad particles into fixed form upon solidification of the cladding constituent.

3. The method of claim 1, wherein the amount of cladding constituent is only sufficient to substantially envelope the agitated cereal particles without substantially interparticle adhesion; and maintaining agitation of the clad particles during solidification of the cladding constituent.

4. The method of claim 3, comprising agitating the cereal particles in a tumbling drum during application of the cladding constituent.

5. The method of claim 3, additionally comprising applying to the clad cereal particles a dry particle mix at about the time of solidification of the cladding constituent.

6. The method of claim 5, wherein the clad cereal particles are superficially dry coated with dry particles selected from the group consisting of dry milk solids, refined sugar or sugar substitute, and mixtures thereof.

7. A packaged food product made according to the method of claim 1.

8. A packaged food product made according to the method of claim 5.

References Cited

UNITED STATES PATENTS

| | | | |
|---|---|---|---|
| 2,170,155 | 8/1939 | Musher | 99—83 |
| 2,278,466 | 4/1942 | Musher | 99—1 |
| 2,824,806 | 2/1968 | Matz | 99—83 |
| 3,431,112 | 3/1969 | Durst | 99—83X |

RAYMOND N. JONES, Primary Examiner